Patented Feb. 11, 1941

2,231,318

UNITED STATES PATENT OFFICE 2,231,318

METHOD OF TREATING ALUNITE

Ernest C. Bierce, Pasadena, Calif.

No Drawing. Application October 3, 1938,
Serial No. 233,132

2 Claims. (Cl. 252—300)

This invention relates to a decolorizing and refining filtering material for use in the treatment of oil and to the method of producing such material.

The invention further relates to a method of treating the mineral known as alunite for the extraction of valuable fertilizer salts and for the production of a decoloring filtering material for use in the treatment of oils.

The mineral alunite consists largely of certain oxides of aluminum with which are associated sulphates of potassium and sodium, these substances being substantially in a homogeneous solid solution.

Heretofore alunite has been used as a source of sulphate of potash and the residue, after the extraction of the potash, has been regarded as waste material.

I have discovered that by a proper treatment of alunite the sulphates of potassium and sodium can be separated therefrom and that the residue, after said separation, is a material which is highly effective in the decoloring of mineral oils by filtering or seeping the oil therethrough. I have further discovered that by treating this residue in a certain manner after the separation of the potassium and sodium sulphates the effectiveness of such material as a decolorer for oil is greatly enhanced.

It is to be noted that the new material may be used in place of fuller's earth as a filler for Gray and other towers in which fuller's earth is customarily placed and through which vapors, such as those of gasoline or cracked hydro-carbons are passed and refined. In fact the new material is possessed of great utility wherever activated aluminum is used, as for example in the dehydrogenation of the lower paraffins over activated aluminum, my new material replacing the activated alumina as commonly prepared and used.

In the preparation and treatment of the alunite I prefer to break the ore to approximately 8-mesh size, although this is not essential for the proper operation of the process. However, if the ore be broken down to this size the subsequent steps necessary in my process will be much easier of operation. Furthermore, the desired results will be obtained in a shorter time in carrying out the process than if the ore was of larger size. It is not desirable to crush the ore to much finer than 8-mesh size because the resulting product will be composed of particles too small for the proper percolation of oil there through.

The ore broken as above is introduced into a suitable kiln or other calcining device wherein it is raised to a temperature suitable to insure the breaking of the bond between the potassium and sodium salts and the oxides of aluminum. Any temperature sufficient for the above results may be used, and with certain alunite ores it is found that they will yield to a lower temperature than others. It is preferable to use a temperature between 1200 and 1600° F. since this range of temperature gives excellent results. If too high temperatures are used a certain amount of sodium aluminate and potassium aluminate will be formed and this will detract from the percentage of the oxides of aluminum and consequently from the subsequent efficiency of the product as a decolorer.

After calcination the product is introduced into water while hot, as by a tray conveyor. The water receiving the calcined material is preferably contained in a Dorr or similar agitator, and the water and calcined material is thoroughly agitated. Since the calcined material is introduced while hot, the temperature of the water rises to substantially the boiling point. This results in the solution of the bulk of the potassium and sodium salts.

After the agitation has been carried on sufficiently to dissolve the soluble salts, the undissolved material and the solution will be fed slowly into a Dorr classifier, the rapidity of the feed being in accordance with the capacity with the classifier equipment. At this time a separation is made of the coarse material and the fine material. The fines and the bulk of the solution containing the soluble and valuable potash and other salts are then led off for further treatment. It is to be understood that while a classifier forms a convenient apparatus for thus separating the coarse materials from the fines and solution any other apparatus for effecting such separation may be used.

In the coarse material as thus separated there will still be contained small amounts of caustic soda and potash and this material is then preferably mixed, as by means of a sand pump circulating the material back and forth from a tank, with an acid solution, for which purpose I find sulphuric acid the most convenient to use because of its low cost, and because of the fact that the potassium and sodium salts were originally sulphates in ore. However, any suitable acid will serve the purpose. By means of this operation the caustic soda and caustic potash that were formed in the calcining and washing operations will be neutralized. It is found that for the formation of the best decoloring material from alunite it is essential that the resulting product give a slight acid reaction. The percentage of acid used will depend on the amount of dissociation taking place in the calcination and washing operations and the consequent amount of caustic salts formed. Usually a weight of acid equal to two per cent of the weight of the separated coarse material is generally ample, and under these conditions the acid will not affect the oxides of aluminum. The material is then further washed to wash out substantially all free salts and acid.

The material, resulting from the calcination and solution process, is dried either with or without the step of neutralizing by acid. After drying, the material is preferably calcined a second time at any desired temperature between 600° and 1600° F. For commercial purposes it is best to perform the second calcination at about 600° F. and leave any further calcination at higher temperatures to the oil refiner to whom the product is sold. This is because of the fact that this material works best with this type of oil when it is recalcined at the proper temperature. For instance, calcining at about 1600° F. gives the material its maximum efficiency for yield at the refinery of dark colored finished cylinder or bright stocks, whereas at the minimum temperature, that is between 1000° and 1200° F. gives the refiner the maximum yield of light distillate oils. However, the second calcining is highly desirable even though it be followed by calcining by the purchaser, since this second calcining sets the material and prevents the formation of dust or extremely fine material from the coarse material. While I have indicated 1600° F. as a preferred upper limit for calcination it may be desirable in some instances, to use higher temperatures.

In addition to the foregoing I have found it desirable for the production of a decolorizing and refining material best suited to the percolation of distillate oils, and also for some cylinder oils, it is advantageous to follow the step of acid washing, before drying, by mixing with the acid washed material a small percentage of a salt of a metal in the group containing iron, zinc, aluminum, and magnesium. The sulphates or chlorides of these materials give equally good results. The percentage of such salts to be used is from 0.5 to 2% of the weight of the material to be treated. After the addition of the selected salt and the thorough mixing of the same in the material to which it is added, the resulting mix is further mixed with a small percentage of soluble silicate, such as sodium silicate, with a sufficient quantity of the latter to combine with the amount of soluble metal salt that has just been added. The result is the precipitation within interstices and capillary recesses of the alumina, of small amounts of metal silicates such as iron silicate, which I find serves as a binder and solidifier of the particles of the aluminum oxides and which silicates also have virtue as decolorizers. An important advantage of this process and the material formed thereby is that the material, after being used on oils, may be reburned and revivified.

What is claimed is:

1. That process of treating alunite to form material for decolorizing and refining mineral oils by percolation there through which includes subjecting alunite to calcination at a temperature sufficient to break the bond between the potassium and sodium salts of the alunite and the aluminum content of the alunite, subjecting the calcined material to the action of water to dissolve the potassium and sodium salts, separating the solution from the heavy solid matter neutralizing the alkaline content of latter, mixing with the neutralized material a salt of the group consisting of the chlorides and sulphates of iron, zinc, aluminum and magnesium, adding to the mixture a soluble silicate, and drying the mass.

2. That process of treating alunite to form material for decolorizing and refining mineral oils which includes subjecting alunite to calcination at a temperature between 1200° F. and 1600° F., subjecting the calcined material while hot from the calcination to the action of water to dissolve potassium and sodium salts, separating the coarser undissolved solids from the fines and the solution, neutralizing the alkaline content of the undissolved solids, mixing with the neutralized material a salt of the group consisting of the chlorides and sulphates of iron, zinc, aluminum and magnesium and drying the mass, and recalcining the dried material.

ERNEST C. BIERCE.